(12) United States Patent
Papadopoulos et al.

(10) Patent No.: US 8,855,221 B2
(45) Date of Patent: Oct. 7, 2014

(54) METHOD AND APPARATUS FOR ITERATIVE RECEIVER STRUCTURES FOR OFDM/MIMO SYSTEMS WITH BIT INTERLEAVED CODED MODULATION

(75) Inventors: Haralabos Papadopoulos, San Jose, CA (US); Ming-Yang Chen, Stanford, CA (US); Sean A. Ramprashad, Los Altos, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1112 days.

(21) Appl. No.: 12/558,367

(22) Filed: Sep. 11, 2009

(65) Prior Publication Data

US 2010/0111232 A1 May 6, 2010

Related U.S. Application Data

(60) Provisional application No. 61/097,148, filed on Sep. 15, 2008.

(51) Int. Cl.
| | |
|---|---|
| *H04K 1/10* | (2006.01) |
| *H04L 1/06* | (2006.01) |
| *H04L 25/03* | (2006.01) |
| *H04L 27/26* | (2006.01) |
| *H04L 1/00* | (2006.01) |

(52) U.S. Cl.
CPC . *H04L 1/06* (2013.01); *H04L 1/005* (2013.01); *H04L 25/03216* (2013.01); *H04L 27/2647* (2013.01)
USPC ............ 375/260; 375/340; 375/316; 375/259

(58) Field of Classification Search
USPC ................................. 375/340, 260, 316, 259
See application file for complete search history.

(56) References Cited

U.S. PATENT DOCUMENTS

| | | | |
|---|---|---|---|
| 5,903,842 | A | 5/1999 | Wang et al. |
| 5,982,327 | A | 11/1999 | Vook et al. |

(Continued)

FOREIGN PATENT DOCUMENTS

| | | |
|---|---|---|
| EP | 1162750 A2 | 12/2001 |
| EP | 1383246 A2 | 1/2004 |

(Continued)

OTHER PUBLICATIONS

Clemens Michalke et al: "Linear Mimo Receivers vs. Tree Search Detection: A Performance Comparison Overview" Personal, Indoor and Mobile Radio Communications, 2006 IEEE 17th Inter National Symposium on, IEEE, PI, Sep. 1, 2006, pp. 1-7, XP031023610 ISBN: 978-1-4244-0329-5.*

(Continued)

*Primary Examiner* — Zewdu Kassa
(74) *Attorney, Agent, or Firm* — Blakely, Sokoloff, Taylor & Zafman LLP

(57) ABSTRACT

The techniques and components described herein may improve the performance for a class of reduced-complexity receiver designs for coded OFDM MIMO systems with bit interleaved coded modulation. The receiver structures described are soft-input soft-output inner/outer decoder receiver structures that include one or more of the following: 1) an inner decoder that includes a linear front-end followed by a limited tree-search based on a soft-output M-algorithm; 2) a conventional near-optimal or optimal decoder for the outer binary code; and 3) iterative decoding (ID), whereby decoding (output) information is passed from one decoder module as input to the other and used to refine and improve the inner/outer decoding module outputs.

22 Claims, 6 Drawing Sheets

(56) References Cited

U.S. PATENT DOCUMENTS

| | | |
|---|---|---|
| 6,182,264 B1 | 1/2001 | Ott |
| 6,629,287 B1 | 9/2003 | Brink |
| 6,804,307 B1 | 10/2004 | Popovic |
| 6,862,552 B2 | 3/2005 | Goldstein et al. |
| 6,901,117 B1 | 5/2005 | Classon et al. |
| 6,976,087 B1 | 12/2005 | Westfall et al. |
| 7,042,856 B2 | 5/2006 | Walton et al. |
| 7,042,858 B1 | 5/2006 | Ma et al. |
| 7,072,295 B1 | 7/2006 | Benson et al. |
| 7,095,812 B2 | 8/2006 | Chan et al. |
| 7,251,768 B2 | 7/2007 | Giannakis et al. |
| 7,308,047 B2 | 12/2007 | Sadowsky |
| 7,310,369 B1 | 12/2007 | Krieger et al. |
| 7,436,895 B1 | 10/2008 | Tujkovic |
| 7,441,045 B2 | 10/2008 | Skene et al. |
| 7,443,925 B2 | 10/2008 | Mehta et al. |
| 7,564,915 B2 | 7/2009 | Lee et al. |
| 7,620,117 B2 | 11/2009 | Chae et al. |
| 7,877,097 B2 | 1/2011 | Zhu et al. |
| 7,877,108 B2 | 1/2011 | Wengerter et al. |
| 8,027,407 B2 | 9/2011 | Papadopoulos |
| 8,042,031 B2 | 10/2011 | Chen et al. |
| 2002/0114404 A1 | 8/2002 | Aizawa et al. |
| 2002/0118781 A1* | 8/2002 | Thomas et al. ............... 375/347 |
| 2002/0176431 A1 | 11/2002 | Golla et al. |
| 2003/0002505 A1 | 1/2003 | Hoch et al. |
| 2003/0072254 A1 | 4/2003 | Ma et al. |
| 2003/0235149 A1 | 12/2003 | Chan et al. |
| 2003/0236080 A1 | 12/2003 | Kadous et al. |
| 2004/0013180 A1 | 1/2004 | Giannakis et al. |
| 2004/0022179 A1 | 2/2004 | Giannakis et al. |
| 2004/0042400 A1 | 3/2004 | Horlin et al. |
| 2004/0116146 A1 | 6/2004 | Sadowsky et al. |
| 2004/0165675 A1 | 8/2004 | Ito et al. |
| 2004/0205445 A1 | 10/2004 | Xu |
| 2005/0010675 A1 | 1/2005 | Jaggi |
| 2005/0041751 A1 | 2/2005 | Nir et al. |
| 2005/0047514 A1 | 3/2005 | Bolinth et al. |
| 2005/0068918 A1 | 3/2005 | Mantravadi et al. |
| 2005/0111592 A1 | 5/2005 | Yee |
| 2005/0152391 A1 | 7/2005 | Effros et al. |
| 2005/0185707 A1 | 8/2005 | Hoo et al. |
| 2005/0220040 A1 | 10/2005 | Petrovic et al. |
| 2005/0265280 A1 | 12/2005 | Roh et al. |
| 2006/0002312 A1 | 1/2006 | Delattre et al. |
| 2006/0020560 A1 | 1/2006 | Rodriguez et al. |
| 2006/0029124 A1 | 2/2006 | Grant et al. |
| 2006/0039489 A1 | 2/2006 | Ikram et al. |
| 2006/0098760 A1 | 5/2006 | Shen et al. |
| 2006/0146716 A1 | 7/2006 | Lun et al. |
| 2006/0146791 A1 | 7/2006 | Deb |
| 2006/0148506 A1 | 7/2006 | Hoo |
| 2006/0152391 A1 | 7/2006 | Sakuyama |
| 2006/0176945 A1 | 8/2006 | Li |
| 2006/0276217 A1 | 12/2006 | Khojastepour et al. |
| 2007/0041475 A1 | 2/2007 | Koshy et al. |
| 2007/0066229 A1 | 3/2007 | Zhang et al. |
| 2007/0121499 A1 | 5/2007 | Pal et al. |
| 2007/0156919 A1 | 7/2007 | Potti et al. |
| 2007/0198899 A1 | 8/2007 | Yellin et al. |
| 2007/0213013 A1 | 9/2007 | Kim |
| 2007/0223423 A1 | 9/2007 | Kim et al. |
| 2007/0281633 A1 | 12/2007 | Papadopoulos |
| 2007/0286313 A1 | 12/2007 | Nikopour-Deilami et al. |
| 2008/0025430 A1 | 1/2008 | Sadowsky |
| 2008/0032630 A1 | 2/2008 | Kim et al. |
| 2008/0075022 A1 | 3/2008 | Lei et al. |
| 2008/0092028 A1 | 4/2008 | Orio |
| 2008/0101310 A1 | 5/2008 | Marzetta |
| 2008/0123781 A1 | 5/2008 | Pisek et al. |
| 2008/0181339 A1 | 7/2008 | Chen et al. |
| 2008/0212526 A1 | 9/2008 | Oyman |
| 2009/0082054 A1 | 3/2009 | Li et al. |
| 2009/0213954 A1 | 8/2009 | Bursalioglu et al. |
| 2009/0225878 A1 | 9/2009 | Papadopoulos et al. |
| 2009/0268684 A1 | 10/2009 | Lotti et al. |
| 2009/0285323 A1* | 11/2009 | Sundberg et al. ............. 375/267 |
| 2009/0291699 A1 | 11/2009 | Heath et al. |
| 2009/0296842 A1 | 12/2009 | Papadopoulos et al. |

FOREIGN PATENT DOCUMENTS

| | | |
|---|---|---|
| EP | 1 411 693 A2 * | 4/2004 |
| EP | 1 411 6936 A2 * | 4/2004 |
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 * | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

A. Anastasopoulos, K. Chugg, "Adaptive Soft-Input Soft-Output Algorithms for Iterative Detection with Parametric Uncertainty", IEEE, vol. 48, No. 10, Oct. 2000, pp. 1638-1649.*

Final Office Action for U.S. Appl. No. 11/873,248, dated Sep. 1, 2010, 21 pages.

Office Action for U.S. Appl. No. 11/939,353 dated Jan. 31, 2011, 15 pages.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

Office Action for U.S. Appl. No. 11/644,638, dated Sep. 22, 2009, 13 pages.

PCT International Preliminary Report on Patentability for PCT Patent Application No. PCT/US2007/013074, dated Dec. 30, 2009, 8 pages.

PCT International Search Report for PCT Patent Application No. PCT/US2008/006287, dated Oct. 2, 2008, 6 pgs.

Written Opinion of the International Searching Authority for PCT Patent Application No. PCT/US2008/006287, dated Oct. 2, 2008, 7 pgs.

PCT International Preliminary Report on Patentability for PCT Patent Application No. PCT/US2008/065675, dated Dec. 17, 2009, 8 pages.

PCT International Search Report for PCT Patent Application No. PCT/US2009/054937, dated Dec. 30, 2009, 7 pgs.

(56) References Cited

OTHER PUBLICATIONS

Written Opinion of the International Searching Authority for PCT Patent Application No. PCT/US2009/054937, dated Dec. 30, 2009, 7 pgs.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
Office Action for U.S. Appl. No. 12/538,733, Oct. 18, 2011, 11 pgs.
Office Action for U.S. Appl. No. 12/538,739, Dec. 7, 2011, 23 pgs.
Final Office Action for U.S. Appl. No. 12/538,733, Mar. 27, 2012, 6 pgs.
Final Office Action for U.S. Appl. No. 12/335,409, Mar. 19, 2012, 22 pgs.
Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
Notice of Allowance for U.S. Appl. No. 11/754,903, Mar. 12, 2012, 8 pgs.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
Office Action for U.S. Appl. No. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
Office Action for U.S. Appl. No. 12/209,110 dated Feb. 11, 2011, 20 pages.
Office Action for U.S. Appl. No. 12/121,649, Apr. 19, 2011, 25 pgs.
Office Action for U.S. Appl. No. 12/130,821, Feb. 22, 2011, 12 pgs.
Office Action for U.S. Appl. No. 12/121,634, Mar. 1, 2011, 19 pgs.
Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
Final Office Action for U.S. Appl. No. 12/040,653, dated Jun. 15, 2010, 40 pages.
Notice of Allowance for U.S. Appl. No. 12/538,733, dated Apr. 26, 2012, 6 pgs.
Office Action for U.S. Appl. No. 12/476,066, dated May 30, 2012, 14 pgs.
Notice of Allowance for U.S. Appl. No. 12/335,409, dated Jul. 19, 2012, 8 pgs.
Office Action for U.S. Appl. No. 12/546,471, dated May 21, 2012, 11 pgs.
Office Action for U.S. Appl. No. 12/209,110, dated Jun. 12, 2012, 39 pgs.
Notice of Allowance for U.S. Appl. No. 11/644,638, dated Jun. 9, 2011, 11 pgs.
Notice of Allowance for U.S. Appl. No. 12/121,634, dated Aug. 12, 2011, 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs. *English Translation*.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.

(56) References Cited

OTHER PUBLICATIONS

Written Opinion of the International Searching Authority dated Apr. 30, 2009 for PCT/US2007/022189, 8 pages.

PCT International Search Report for PCT Patent Application No. PCT/US2009/035735, dated Jul. 13, 2009, 5 pages.

Written Opinion of the International Searching Authority for PCT Patent Application No. PCT/US2009/035735, dated Jul. 13, 2009, 8 pages.

Lattice Semiconductor Corp., "Turbo Decoder", IP Data Sheet, 2003, 6 pages.

Kao, Chien-Yu, "A Bi-directional SOVA with Normalization for Turbo Decoding", Jun. 2006, Tainan, Taiwan, 72 pages.

Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.

Alamouti, Siavash M., "A Simple Transmit Diversity Technique for Wireless Communications", IEEE Journal on Select Areas in Communications, vol. 16, No. 8, Oct. 1998, pp. 1451-1458.

Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.

Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.

Lee, Inkyu, et al., "Space-Time Bit-Interleaved Coded Modulation for OFDM Systems", IEEE Transactions on Signal Processing, vol. 52, No. 3, Mar. 2004, pp. 820-825.

Lee, Heunchul, et al., "A Flexible Space-Time Coding System with Unequal Error Protection", IEEE, 2005, 5 pages.

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, Inkyu, et al., "Code Construction for Space-Time Bit-Interleaved Coded Modulation Systems", IEEE Communications Society, 2004, 5 pages.

Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.

Lee, Inkyu, et al., "Code Design of Space-Time Bit-Interleaved Coded Modulation Systems for Maximum Diversity", ICC, Jun. 2004, 11 pages.

Taddei, Herve, et al., Mode Adaptive Unequal Error Protection for Transform Predictive Speech and Audio Coders, IEEE, 2002, pp. 165-168.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008 IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Block Source Coding", IEEE GLOBECOM 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

(56) References Cited

OTHER PUBLICATIONS

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On EXIT-Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

Viswanath, P., et al., "Sum Capacity of the Multiple Antenna Gaussian Broadcast Channel and Uplink-Downlink Duality", IEEE Transactions on Information Theory, Aug. 2003, pp. 1912-1923.

Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.

Joham, M., et al., "Linear Transmit Processing in MIMO Communications Systems", IEEE Transactions on Signal Processing, Aug. 2005, pp. 2700-2712.

Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.

Catt, "Non-codebook based pre-coding for E-UTRA TDD Downlink", 3rd Generation Partnership Project, Oct. 4, 2006, pp. 1-3.

Gomadam, K.S., et al., "Techniques for Multi-user MIMO with Two-way Training", IEEE International Conference on Communications, May 19, 2008, pp. 3360-3366.

Michalke, Clemens, et al., "Linear MOMO Receivers vs. Tree Search Detection: A Performance Comparison Overview", IEEE Internatinal Symposium on Personal, Indoor and Mobile Radio Communications, Sep. 11, 2006, pp. 1-7.

Narayanan, K.R., et al., "Low Complexity Turbo Equalization with Binary Coding", IEEE International Conference on Communications, ICC '2000, New Orleans, pp. 1-5, vol. 1.

Hoeher, Peter, "Advances in Soft-Output Decoding", IEEE Global Telecommunications Conference, Nov.-Dec. 1993, pp. 793-797.

Stiglmayr, Stephan, et al., "Adaptive Coding and Modulation in OFDM Systems using BICM and Rate-Compatible Puntured Codes", 7 pages.

G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.

Final Office Action for U.S. Appl. No. 12/209,110, dated Jul. 14, 2011, 26 pgs.

Office Action for U.S. Appl. No. 12/335,409, dated Aug. 16, 2011, 20 pgs.

Notice of Allowance for U.S. Appl. No. 11/664,638, dated Jun. 9, 2011, 10 pgs.

Office Action for U.S. Appl. No. 11/754,903, dated Jun. 6, 2011, 11 pgs.

Office Action for U.S. Appl. No. 11/644,638, dated Sep. 30, 2010, 24 pages.

Korean Office Action for corresponding Korean Patent Application No. 2008-7025123, dated Sep. 29, 2010, 3 Pgs.

PCT International Preliminary Report on Patentability for PCT Patent Application No. PCT/US2009/035735, dated Sep. 16, 2010, 8 pages.

European Office Action for corresponding European Patent Application No. 07861675.2, dated Jul. 26, 2010, 4 pgs.

Office Action for U.S. Appl. No. 11/754,903, dated Sep. 20, 2010, 18 pages.

Office Action for U.S. Appl. No. 11/939,353, dated Sep. 22, 2010, 15 pages.

Office Action for U.S. Appl. No. 12/040,653, dated Dec. 11, 2009, 33 pages.

PCT International Preliminary Report on Patentability for PCT Patent Application No. PCT/US2008/003274, dated Sep. 24, 2009, 10 pages.

PCT International Search Report for PCT Patent Application No. PCT/US2007/013074, dated Dec. 2, 2009, 8 pgs.

Written Opinion of the International Searching Authority for PCT Patent Application No. PCT/US2009/046014, dated Nov. 27, 2009, 8 pgs.

Stiglmayr, Stephan, et al., "Adaptive Coding and Modulation in OFDM Systems using BICM and Rate-Compatible Punctured Codes", 7 pages.

Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.

Yiu, Simon, et al., "Optimization of Distributed Space-Time Filtering", IEEE 62nd Vehicular Technology Conference, Sep. 2005, pp. 1829-1833, Piscataway, New Jersey, USA.

Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.

Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.

PCT International Search Report for PCT Patent Application No. PCT/US2009/046014, dated Nov. 27, 2009, 7 pgs.

Written Opinion of the International Searching Authority for PCT Patent Application No. PCT/US2007/013074, dated Dec. 2, 2009, 8 pgs.

Office Action for U.S. Appl. No. 11/754,903, dated Mar. 29, 2010, 11 pages.

PCT International Search Report for PCT Patent Application No. PCT/US2009/053471, Dec. 15, 2009, 7 pgs.

PCT Writen Opinion of the International Searching Authority for PCT Patent Application No. PCT/US2009/053471, Dec. 15, 2009, 9 pgs.

PCT International Preliminary Report on Patentability for PCT Appl. No. PCT/US2009/034758, Aug. 31, 2010, 6 pgs.

PCT International Preliminary Report on Patentability for PCT Appl. No. PCT/US2009/046014, Dec. 6, 2010, 7 pgs.

PCT International Search Report for PCT Patent Application No. PCT/US2009/046014, Nov. 27, 2009, 3 pgs.

PCT Writen Opinion of the International Searching Authority for PCT Patent Application No. PCT/US2009/046014, Nov. 27, 2009, 6 pgs.

PCT International Preliminary Report on Patentability for PCT Appl. No. PCT/US2009/053472, Feb. 15, 2011, 5 pgs.

(56) References Cited

OTHER PUBLICATIONS

European Office Action for European Patent Application No. 09715574.1, Jan. 11, 2012, 6 pgs.
European Office Action for European Patent Application No. 08832132.8, Feb. 10, 2012, 5 pgs.
Office Action for U.S. Appl. No. 12/700,585, dated Oct. 15, 2012, 9 pgs.
Final Office Action for U.S. Appl. No. 12/209,110, dated Dec. 28, 2012, 40 pgs.
Final Office Action for U.S. Appl. No. 12/476,066, dated Jan. 8, 2013, 16 pgs.
Final Office Action for U.S. Appl. No. 12/538,739, dated Aug. 3, 2012, 35 pgs.
Office Action for U.S. Appl. No. 12/546,471, dated Dec. 26, 2012, 11 pgs.
Office Action for U.S. Appl. No. 12/772,717, dated Feb. 13, 2013, 11 pgs.
Sen, et al., "Cute and jCUTE Concolic Unit Testing and Explicit Path Model-Checking Tool", Computer Aided Verification Lecture Notes in Computer Science, Jan. 1, 2006, pp. 419-423.
Majumdar, et al., "Hybrid Concolic Testing", IEEE 29th International Conference on Software Engineering, May 1, 2007, pp. 416-426.
Taddei, Herve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.
Marsch, Patrick, et al., On multicell cooperative transmission in backhaul-constrained cellular systems, Annals of Telecommunications, May 1, 2008, pp. 253-269, vol. 63, No. 5/6.
Lang, Yidong, et al., "A Novel Resource Allocation Strategy for Distributed MIMO Multi-Hop Multi-Commodity Communications", JEEE International ITG Workshop on Smart Antennas, Feb. 26, 2008, pp. 125-132.
Karakayali, M., et al., "On the Maximum Common Rate Achievable in a Coordinated Network", Mar. 3, 2006, 6 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages.
Caire, G., et al., "Multiuser MIMO Achievable Rates with Downlink Training and Channel State Feedback", 31 pages.
Caire, G., et al., "On the Achievable Throughput of a Multiantenna Gaussian Broadcast Channel", IEEE Transactions on Information Theory, vol. 49, No. 7, Jul. 2003, pp. 1691-1706.
Ernesto Zimmermann, "Complexity Aspects in Near-Capacity MIMO Detection-Decoding", Jan. 1, 2007, pp. 39-70.
Ernesto Zimmermann, et al., "Unbiased MMSE Tree Search Detection for Multiple Antenna Systems", Proceedings of the International Symposium on Wireless Personal Multimedia Communications, Sep. 1, 2006, pp. 806-810.

\* cited by examiner

METHOD AND APPARATUS FOR ITERATIVE RECEIVER STRUCTURES FOR OFDM/MIMO SYSTEMS WITH BIT INTERLEAVED CODED MODULATION

PRIORITY

The present patent application claims priority to and incorporates by reference the corresponding provisional patent application Ser. No. 61/097,148, titled, "A Method and Apparatus for Iterative Receiver Structures for OFDM/MIMO Systems with Bit Interleaved Coded Modulation," filed on Sep. 15, 2008.

FIELD

Embodiments of the present invention relates to the field of wireless transmission in a wireless environment. More particularly, embodiments of the present invention relate to components and techniques receiving Orthogonal Frequency Division Multiplexing (OFDM) signals in multiple-input/multiple-output (MIMO) systems.

BACKGROUND

A broadly deployed class of open-loop single-user multiple-input/multiple-output (MIMO) systems includes coded orthogonal frequency division multiplexing (OFDM) MIMO systems with bit-interleaved coded modulation (BICM). These MIMO systems have the potential to produce very large transmission rates, by providing very high spectral efficiencies (i.e., very large throughputs per unit bandwidth), and optimized diversity-transmission rate trade offs. However, the computational complexity of near-optimal receiver structures for these systems grows exponentially fast with increased spectral efficiencies. Designing receivers for coded OFDM/MIMO systems with BICM that have good performance-complexity trade-offs is thus a very important challenge in deploying reliable systems that can be operated with practical receivers and can achieve high-spectral efficiencies.

FIG. 1 illustrates a block diagram of a system for encoding of information-bearing signals for a single-user MIMO system. The signal is first encoded with an outer binary code, for example a convolutional code, which may be accomplished by convolutional coder 110. The coded signal is interleaved by interleaver 120 and mapped to vector parallel streams by serial-to-parallel converter 130. The parallel streams are modulated by mapper modems 140 and transmitted.

These coded OFDM/BICM/MIMO systems encode the information bearing signal with an outer binary code (e.g., convolutional code, turbo code, low-density parity check (LDPC) code) followed by a bit interleaver, a mapper of bits to symbols (e.g., quadrature amplitude modulation (QAM) symbols), followed by round robin transmission of these symbols over all transmit antennas via OFDM. The typical receivers for these systems have an inner-outer decoder structure, with soft-output decoder modules. The complexity of these receiver structures resides in the inner decoder, referred to as the inner joint demapper. Indeed, the complexity of these inner demappers grows exponentially fast with the number of bits transmitted per channel use, and as a result, exponentially fast with the system spectral efficiency (throughput per unit bandwidth).

A number of reduced complexity receiver structures have been proposed for these systems with various performance complexity trade-offs. One class of these techniques is based on inner demapper structures that make use of what is known as the soft-output M-Algorithm (SOMA) and its variants. The front-end operations that are performed prior to performing soft-SOMA inner decoding can have a significant impact in the performance of these schemes in iterative decoding structures. These designs perform jointly optimized front-end filtering and SOMA tree search and can be shown to significantly improve performance over other existing designs in iterative decoding.

For future wireless systems, it is desirable to have efficient utilization of the radio frequency spectrum in order to increase the data rate achievable within a given transmission bandwidth. This can be accomplished by employing multiple transmit and receive antennas combined with signal processing. A number of recently developed techniques and emerging standards are based on employing multiple antennas at a base station to improve the reliability of data communication over wireless media without compromising the effective data rate of the wireless systems. Specifically, recent advances in wireless communications have demonstrated that by jointly encoding symbols over time and transmit antennas at a base station one can obtain reliability (diversity) benefits as well as increases in the effective data rate from the base station to each cellular user.

These multiplexing (throughput) gains and diversity benefits depend on the space-time coding techniques employed at the base station. The multiplexing gains and diversity benefits are also inherently dependent on the number of transmit and receive antennas in the system being deployed. Specifically, these trade offs between multiplexing gains and diversity are fundamentally limited by the number of transmit and the number of receive antennas in the system.

For high data rates and wideband transmission the use of OFDM makes the equalizer unnecessary. With multilevel modems, coded modulation systems can be designed by means of an outer binary code, for example, a convolutional code and an interleaver in a bit-interleaved coded modulation (BICM) system.

Existing receiver structures for the transmission systems, for example, for coded MIMO/OFDM/BICM/ID systems, include an inner-outer decoder structure, whereby the outer decoder is optimally selected. The designs generally include the following features. Iterative decoding receivers using a MAP-based inner decoder and a MAP-based outer decoder yield the optimum bit-error-rate performance among all inner/outer decoder structures. However, the MAP-based inner decoder becomes computationally intractable as N (number of transmit antennas/number of QAM symbols that need to be jointly resolved) and B (number of bits represented by each QAM symbol) increase.

ID systems with a maxlogMAP-based inner decoder have less complexity than the MAP-based system and are asymptotically (high SNR) optimal in that they have near optimum bit-error-rate performance at high SNR. However, the maxlogMAP-based inner decoder also becomes computationally intractable as N and B increase.

Receivers using QRD/M-Algorithm based inner decoder also use a variant of the M-algorithm to produce hard bit estimates along with reliability information. As a result they can yield drastic reductions in complexity by proper choice of the M parameter, at a cost in bit-error-rate performance. These methods directly employ the "hard-output" M-algorithm, to generate hard-output estimates, and then employ the resulting M candidates to obtain soft information. However, to generate soft information for any bit location, both values of the bit must be available in the pool of the remaining M candidates. As a result, these methods resort to heuristic (and inferior) techniques to generate soft output for each bit. In addition these structures do not typically exploit iterative decoding.

MMSE-based inner decoders consisting of a linear MMSE-front end followed by QAM symbol/by QAM symbol soft-output generation methods have lower complexity, but suffer in bit-error-rate performance, especially at higher outer-code rates. At such rates higher-complexity inner decoders, which use QR-decomposition linear front-ends with channel-adaptive tree-search symbol-reordering, in order to perform tree searches that are based on a forward pass only or a forward-backward pass SOMA algorithm, have higher performance. However, these schemes are inferior to the proposed schemes in iterative decoding settings.

SUMMARY

Methods and apparatuses are disclosed herein for iterative decoding based on signals that are received from a transmitter that transmitted the signals using orthogonal frequency division multiplexing (OFDM) and bit interleaved coded modulation. In all embodiments, the disclosed decoders comprise iterative inner/outer decoder structures with soft-output M-algorithm (SOMA) based inner decoders and whereby extrinsic information is exchanged between the outer and the inner decoder at each iteration.

One or more filtered signal estimates are generated based on the extrinsic information. A SOMA-based multiple-input/multiple-output (MIMO) detection process is performed over each tone of the signals by searching a detection tree for each tone, where tree search parameters are selected based on the one or more filtered signal estimates and at least in part on the extrinsic information.

In one embodiment, a receiver for use in an orthogonal frequency division multiplexing (OFDM) wireless communication system to receive signals from a transmitter that transmits the signals using OFDM and bit interleaved coded modulation includes an inner decoder structure and an outer decoder.

The inner decoder structure includes an adaptive front end and is coupled to receive extrinsic information from the outer decoder. The adaptive front end utilizes the extrinsic information from prior outer decoder iterations and channel information corresponding to a portion of the received signals to generate filtered signal estimates. The inner decoder comprises a soft output M-algorithm (SOMA) based multiple-in multiple-out (MIMO) demapper that utilizes the filtered signal estimates to perform inner demapping over each tone.

The outer decoder is coupled with the inner decoder to perform iterative decoding and to provide extrinsic information related to the iterative decoding to the adaptive front end.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 2:
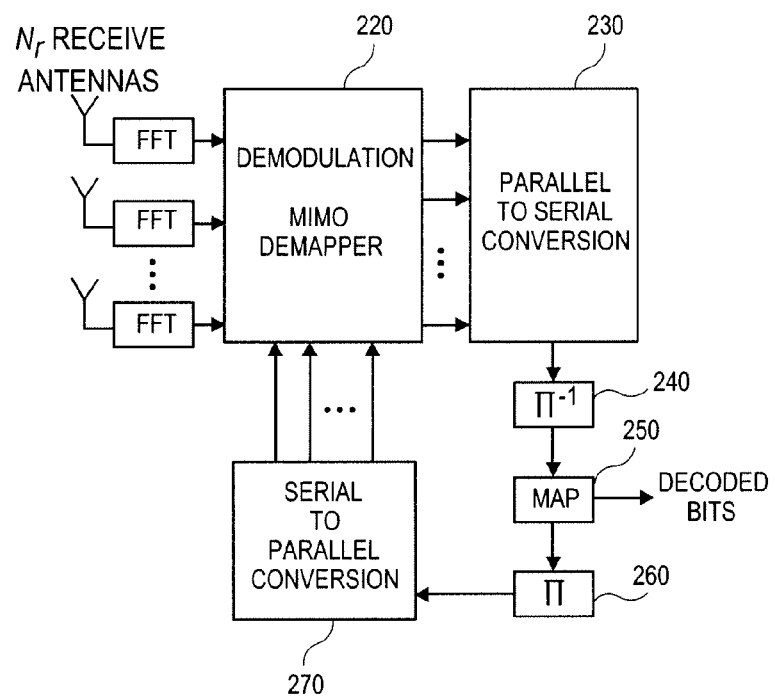
FIG. 2 illustrates a block diagram of one embodiment of a decoding structure having an inner decoder and an outer decoder.

The following description discloses techniques for receiver complexity reduction for MIMO/OFDM/BICM/ID systems of the form depicted in FIG. 2, and is particularly attractive for high-rate schemes of this kind. The design ideas are related to the use of soft-output inner-decoding algorithms that rely on an M-algorithm-based reduced-size tree search. In one embodiment, this involves use of a channel-adaptive linear front end together with a selection of a symbol order that may be used in the tree-search by the soft-output M-algorithm. In one embodiment, both the linear front end, the process by means of which the detection tree is constructed (in terms of the decomposition of codeword metrics into a sum of branch metrics on a tree), the detection tree itself, and the symbol order in the tree-search may be adapted and optimized with iterations in the inner/outer decoding algorithms.

There are also described techniques for operating improved reduced-complexity high-performance receivers for wireless Multiple-Input Multiple-Output (MIMO) systems. MIMO systems transmit multiple streams from multiple transmit antennas in such a way that they can increase the overall system spectral efficiency (throughput per unit bandwidth) and thus the overall throughout. As the numbers of transmit and receive antennas employed are increased, higher overall spectral efficiencies (rate per unit bandwidth) can be attained. These higher rates however come at a cost in terms of increased complexity of the optimal receiver. Described herein are techniques that may reduce the computational complexity of the optimal receiver in these designs.

The techniques and components described herein may improve the performance for a class of reduced-complexity receiver designs for coded OFDM MIMO systems with bit interleaved coded modulation. In one embodiment, the receiver structures described are soft-input soft-output inner/outer decoder receiver structures that include one or more of the following: 1) an inner decoder that includes a linear front-end followed by a limited tree-search based on a soft-output M-algorithm; 2) a conventional near-optimal or optimal decoder for the outer binary code; and 3) iterative decoding (ID), whereby decoding (output) information is passed from one decoder module as input to the other and used to refine and improve the inner/outer decoding module outputs.

Also described herein is a design of the inner decoding module that may reside in a linear front-end, and in techniques to jointly adapt and optimize the tree search through the use of this front-end. This may improve the receiver performance in terms of reduced bit or symbol or block-error rates (for a given received signal-to-noise ratio) over previous front-ends for a given receiver complexity, or reduce the receiver complexity required to achieve a target performance. In one embodiment, adaptation and optimization may occur in each iteration in the inner/outer decoding algorithm. Performance improvements may be seen with iterative decoding as the number of iterations increases.

The described schemes achieve advantageous performance-complexity trade-offs by exploiting, at the inner decoder module, the information provided by the outer decoder module in order to adaptively optimize the linear filtering operation. In one embodiment, the structures implicitly make use of the information provided by the outer decoder regarding the reliability of each symbol, and combine it with measurement and channel state information to define the detection tree and select the tree-search order in a systematic manner at each iteration. Then a reduced tree-search on this tree is conducted via a soft-output M-algorithm in order to generate soft-output information.

The jointly optimized operations allow these receiver structures to yield bit-error rate performance that improves with increasing number of iterations. Furthermore, the bit-error-rate performance gracefully degrades as the M values in the M-algorithm are reduced.

In the following description, numerous specific details are set forth. However, embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Introduction

A system design and process that allows the operation of iterative receiver structures for coded OFDM/MIMO/QAM systems with BICM are described. In one embodiment, the receivers have an inner/outer decoder structure, whereby multiple iterations are performed in decoding following the turbo decoding principle. As the complexity of these structures is dominated by the inner decoder, any existing soft-output channel decoder can be employed, for example, optimal (MAP), or near-optimal (e.g., MaxLogMAP) receivers. However, as described in greater detail below, the inner decoder structure has the ability to adapt and optimize its performance at each iteration, subject to the inherent receiver constraints on computational complexity.

In one embodiment, the receiver structure falls within the class of receivers that can be represented in the block diagram form shown in FIG. 2. The receiver may include OFDM front-end on each receive antenna and iterative decoding between an inner demapper and an outer channel decoder. One embodiment of the inner demapper structure that may be utilized in this OFDM setting is further detailed in FIG. 3. As FIGS. 2 and 3 illustrate, during any given iteration of the decoding operation, there is one demapping (inner-decoding) operation performed on each OFDM tone in the system.

FIG. 2 illustrates a general decoding structure that includes an inner decoder (MIMO demapper 220) that provides demodulation of the parallel received signal. The demodulated signal is converted to a serial signal by parallel to serial converter 230. The serial signal is deinterleaved by deinterleaver 240 and sent to an outer decoder (MAP 250). The decoded signal may be interleaved by interleaver 260 and converted to a parallel signal by serial to parallel converter 270.

Figure 3:
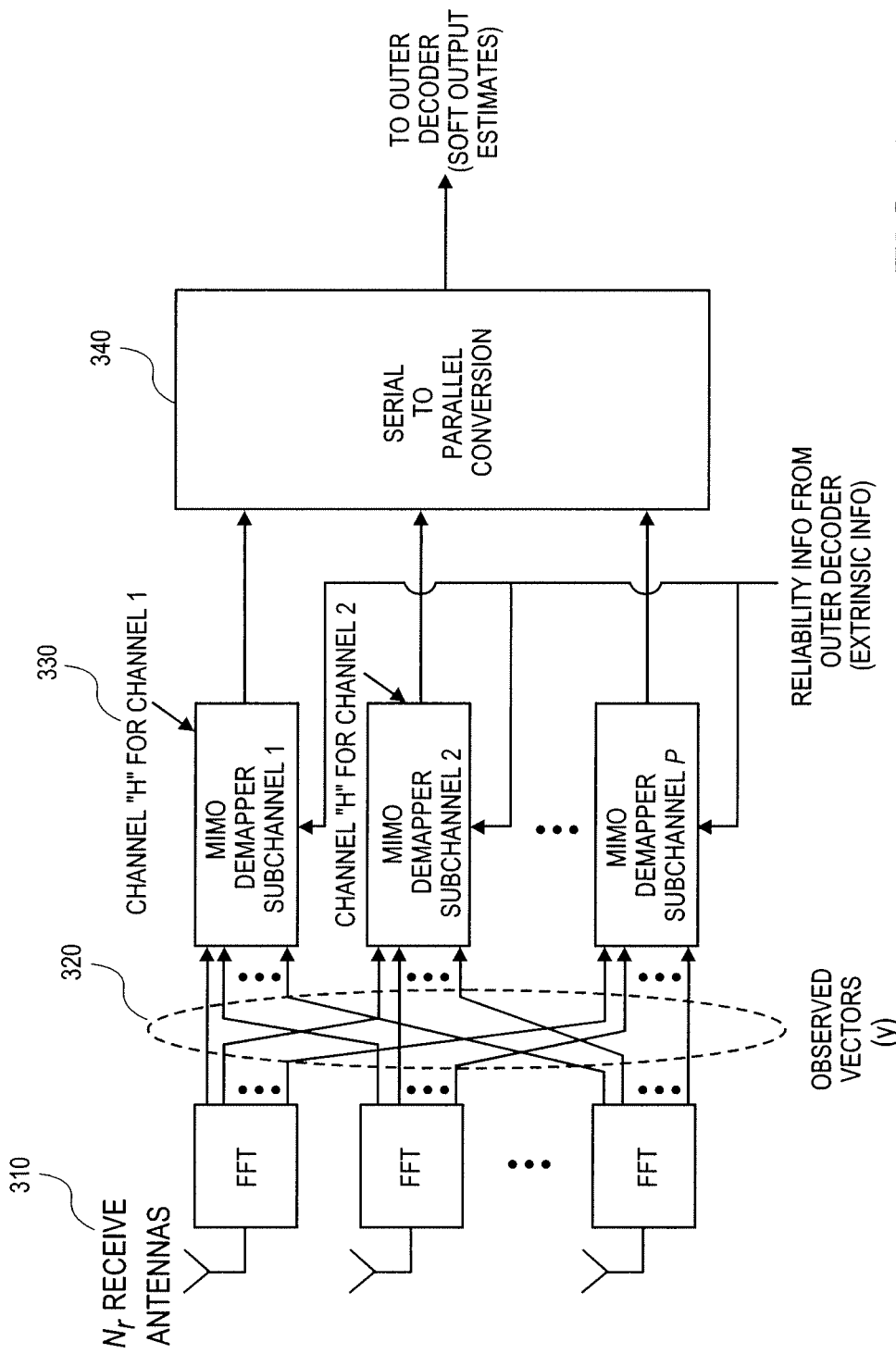
FIG. 3 illustrates a block diagram of one embodiment of joint demapper units of the receiver in a single user MIMO system based on OFDM.

FIG. 3 is a block diagram of one embodiment of joint demapper units for a receiver in a single-user MIMO system based on OFDM. In one embodiment, $N_r$ receive antennae 310 may receive OFDM signals from a transmitting device (not illustrated in FIG. 3). The parallel received signals, labeled observed vectors (y) 320, are provided to parallel MIMO demappers 330. As described in greater detail below, MIMO demappers 330 may receive extrinsic (e.g., reliability) information from an outer decoder. This information may be utilized to control SOMA tree search parameters. The output from MIMO demappers 330 is provided to serial to parallel converter 340. Output form serial to parallel converter 340 is provided to an outer decoder as soft output estimates.

The architecture described herein provides performance improvements when iterative decoding is used. This may be accomplished by exploiting, at the inner decoder module, information provided by the outer decoder module in order to adaptively optimize the linear front-end, the SOMA tree, and the symbol order selected for the SOMA tree search in the inner decoder module. In one embodiment, the front end is affine. In one embodiment, the linear front-end filters the measurements in such a way that allows the computation of the soft-output values for the inner decoding module on a tree with N levels, where N is the number of symbols (or symbol streams) simultaneously transmitted in this MIMO system and satisfies $N=N_t$.

The computation outcome at any given node at full depth of the tree provides a reliability metric for a specific codeword, where a codeword is a specific combination of values for the N transmitted symbols. In one embodiment, together with the linear front-end filtering operation, the module also selects a SOMA tree together with a specific symbol order based on which the metric computations will be performed on a tree by use of a soft-output M-algorithm.

In one embodiment, at depth one, partial metrics are computed for partial codewords depending only on the first-ordered symbol. A subset (e.g., the "best M") of these metrics are used at depth two to compute new partial metrics for all combinations of the associated first-ordered symbol values with all second-ordered symbol values. In one embodiment, this process is repeated until at the full depth N in the tree is reached, at which point path metrics have been computed for a subset of all possible full-length codewords. This technique controls operation of the front-end filter and chooses the way the SOMA tree is constructed and the symbol order for the tree search so as to optimize the performance of the SOMA-based inner decoder. The overall system decoding performance is thus optimized by the choice of the linear front-end and of the decoding order.

In one embodiment, at each iteration and on each OFDM tone, the following is used as an input: 1) a receive vector including measurements collected by the receiver antennas on the given OFDM tone; 2) channel coefficients between transmit and receive antennas; and 3) output information provided by the outer decoder about the reliability of the bits comprising the symbols in the codewords for which the inner decoder is to produce soft output.

The linear front-end can then be selected. One embodiment of this process is illustrated in FIG. 5, which is an expansion of the Front-End module in FIG. 4. A more detailed description of the front end is given in FIG. 6 and may provide the following combination of principles: 1) obtain mean and variance estimate of each symbol in the codeword based on use of the output information from the outer decoder; use this mean estimate and the channel coefficients to subtract the mean contribution from the OFDM tone; 2) compute the conditional linear Mean-Square error (LMSE) based on the OFDM tone and the channel coefficients; 3) in an iterative manner select a symbol order and obtain a corresponding QR decomposition; 4) use the resulting QR decomposition on the measurements to setup the soft-output computation as a tree; and 5) perform a limited-tree search by means of a soft-output M-algorithm in order to generate soft-output information. In one embodiment, the parameters in the soft-output M-algorithm may also be adapted with iterations and with tree depth. In one embodiment, even if the chosen order for the tree is the same between iterations, the method for construction the three and the tree itself changes with each iteration.

In one embodiment, the front-end operations to the SOMA search 1)-4) listed above, allow these receiver structures to yield bit-error rate performance that improves with increasing number of iterations and gracefully degrades as the M values in the M-algorithm are reduced. In addition, the architectures described herein implicitly make good use of the information provided by the outer decoder regarding the reliability of each symbol, and combine it with the measurement and channel state information to construct the tree together with the tree-search order and the branch metric computations in a systematic manner.

Figure 1:
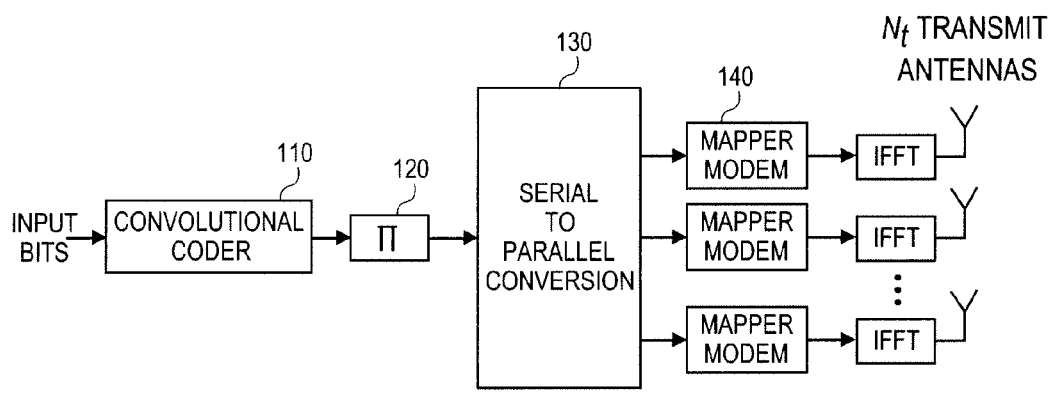
FIG. 1 illustrates a block diagram of a system for encoding of information-bearing signals for a single-user MIMO system.

The description that follows focuses on the description of the inner decoding module (inner demapper) on an arbitrary but fixed OFDM tone (i.e., the description of one of the inner decoding modules shown in FIG. 3). Note that, as shown in FIGS. 1 and 3, there are $N_t$ transmit antennas and $N_r$ receive antennas in the system.

Figure 4:
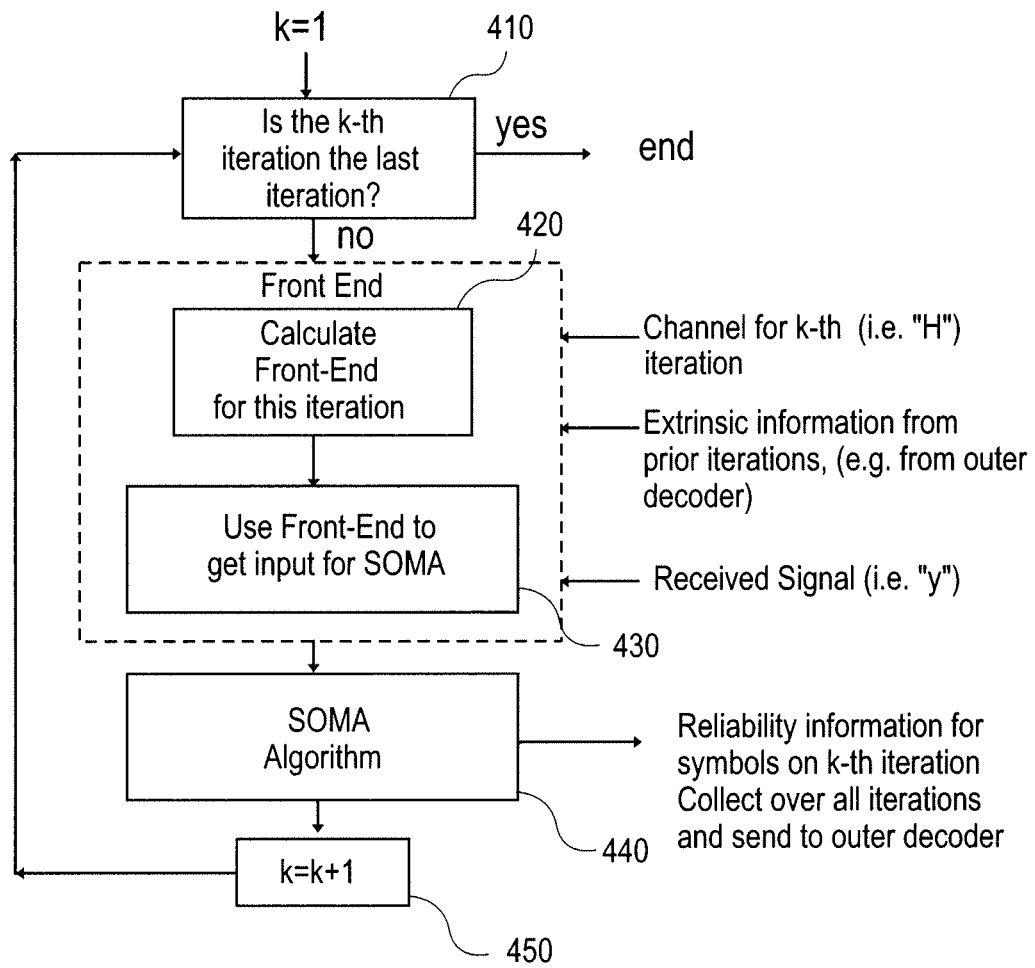
FIG. 4 is a flow diagram of one embodiment of a MIMO demapper operation.
Figure 5:
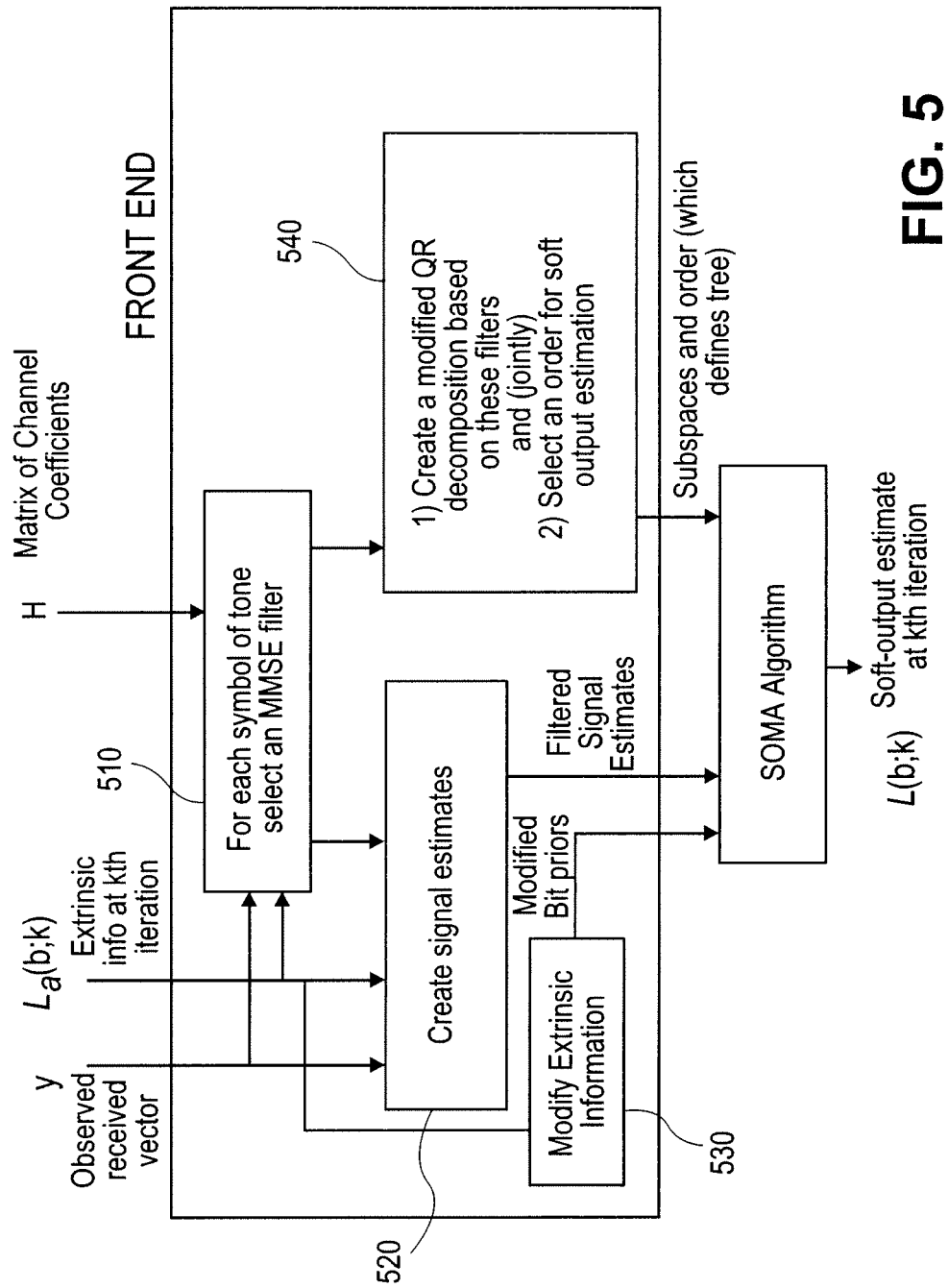
FIG. 5 is a block diagram of one embodiment of a front end.

FIG. 4 is a flow diagram of one embodiment of a MIMO demapper operation on a sample OFDM tone n. This may be performed by the MIMO demapper illustrated in FIG. 2 or FIG. 3, for example, and in that case F decoding operations of the form shown in FIG. 4 are applied in parallel, one for each subchannel/tone n. In one embodiment, for the first iteration (k=1) 410, the front end utilizes channel information (H) on the given tone n for the iteration, extrinsic information from the previous decoding iteration on the symbols transmitted on the given tone n and the received signal on tone n to calculate a front end value for the current iteration, 420. In one embodiment the front end value is a signal estimate described in greater detail below. The front end value is used as an input to the SOMA stage 430. SOMA is performed on the iteration 440 to generate at least reliability information for symbols on the current tone. This reliability information is collected over all tones for the given iteration, it is then deinterleaved via module 240, and is then sent to an outer decoder 250. In the next iteration, the output of the outer decoder is then re-interleaved via module 260 and used to provide the input extrinsic information for each tone demapper for the next iteration. Note that, during any given (and fixed) iteration, the F demmaping operations 420 in FIG. 4 can be performed in series or in parallel.

FIG. 5 is a block diagram of one embodiment of a front end. The block diagram of FIG. 5 provides an expansion of the front end of FIG. 4 and its interaction with the SOMA decoder. In one embodiment, for any given tone the front end receives an observed received signal vector (y), extrinsic information, $L_a(b,k)$, at each iteration and a matrix of channel coefficients, H all pertinent to that tone.

In one embodiment, for each symbol of the tone, the front end selects a conditional MMSE filter 510 based on y, $L_a(b,k)$, and H. The front end uses y, $L_a(b,k)$, and the selected conditional MMSE filter to create signal estimates 520 (filtered signal estimates). In one embodiment, the front end also creates a modified QR decomposition and/or selects the symbol order for the SOMA tree and the SOMA tree itself, using the selected MMSE filter 540. In one embodiment, the front end may process the extrinsic information, $L_a(b,k)$, to generate modified bit priors 530.

The front end provides the modified bit priors, the filtered signal estimates and/or subspaces and order (to define the SOMA tree), to the SOMA decoder 550. In one embodiment, the SOMA decoder 550 provides a soft output estimate for the current iteration.

Figure 6:
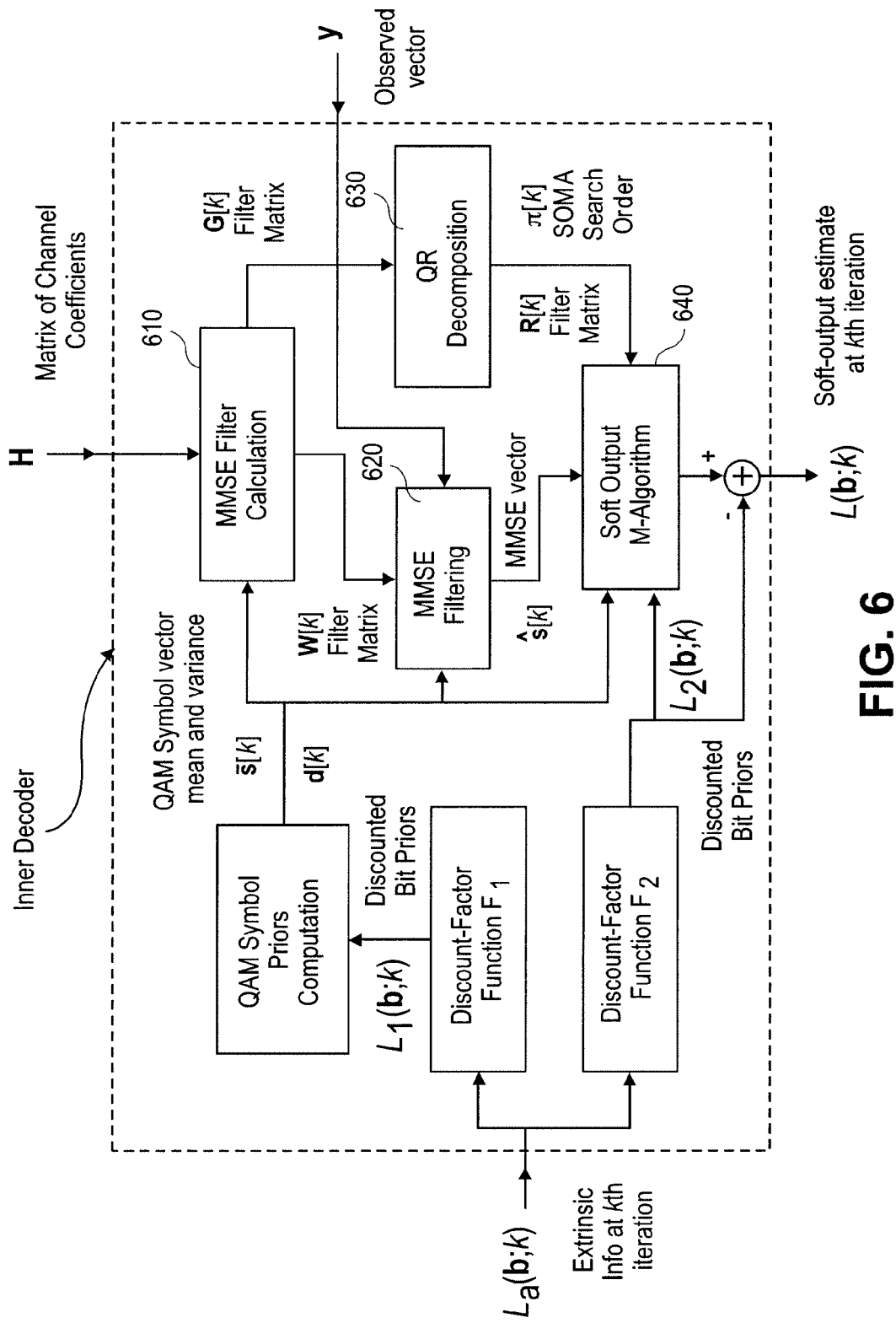
FIG. 6 illustrates details of a MIMO demapper for a subchannel n illustrated in FIG. 3 and expands on details in FIG. 5.

FIG. 6 is a block diagram of one embodiment of an inner demapper structure. This inner demapper may be the MIMO demapper for subchannel n illustrated in FIG. 3. The inner demapper takes as input an $N_r \times 1$ vector of observations y, corresponding to the $N_r$ (complex-valued) scalar measurements collected across all $N_r$ receive antennas on the given OFDM tone. These measurements are related to the $N_t \times 1$ vector $$s=[s_1 s_2 \ldots s_N]^T,$$

representing the $N=N_t$ QAM symbols transmitted by the $N_t$ transmit antennas on the given OFDM tone as follows:

$$y=Hs+w.$$

The $N_r \times 1$ vector w represents the effects of noise and interference on each of the $N_r$ receive antennas, and H is a matrix with dimensions $N_r \times N_t$. The entry of H on the i-th row and the j-th column equals the channel (complex-valued) scaling coefficient (on the given OFDM tone) between the j-th transmit antenna and the i-th receive antenna. As shown in FIG. 6, the inner decoder also takes as input the channel coefficient matrix H. An estimate of the channel coefficient matrix H is obtained at the receiver via pilot-assisted channel estimation, i.e., by signaling known signals (pilots) for s and using the resulting observation vector y at the receiver for channel estimation in a manner well known in the art.

Each of the $N_t = N$ QAM symbols, $s_1 s_2 \ldots s_N$, can take one of Q possible complex values, with $Q = 2^B$, and where B denotes the number of bits per QAM symbol. Let also $$b_k = [b_k^1 b_k^2 \ldots b_k^B]$$

denote the set of B bits that are mapped to the QAM symbol $s_k$ at the transmitter. Let also the $BN_t \times 1$ vector $$b = [b_1 b_2 \ldots b_N]^T$$

denote the collection of all the bits encoded on the given OFDM tone (and thus representing the QAM symbol vector s).

As shown in FIG. 6, in one embodiment, at the k-th iteration the inner decoder also takes as input, extrinsic information produced by the outer decoder on the previous iteration, about the reliability of each bit in the vector b. This quantity is summarized by the $BN_t \times 1$ vector $L_a(b;k)$. The i-th entry of this vector is an estimate of the reliability of the estimate of the i-th entry of the vector b, produced as output by the channel decoder on the preceding iteration. These reliability quantities are log-likelihood ratio estimates for each of the bits comprising the vector b. In one embodiment, on the first iteration, the entries of $L_a(b;k)$ are initialized to the value 0.

The output of the decoder in FIG. 6 is a $BN_t \times 1$ vector $L(b;k)$, which contains new reliability values for the bits in the vector b. One embodiment for generation of this vector $L(b;k)$ is produced at each iteration k is shown schematically in FIG. 6.

In one embodiment, the extrinsic information vector $L_a(b;k)$ is used to produce estimates of the conditional mean and variance of the QAM symbols comprising the vector s. To this end "priors" are first generated for each of the bits in the vector b based on the log-likelihood information $L_a(b;k)$ (input to the inner decoder on the k-th iteration). The discounting factor function $F_1$ is an odd-valued function for which $0 \le F_1(x) < x$ for all $x > 0$, and has the effect of making the bit priors produced by $L_a(b;k)$ more robust. In one embodiment, $F_1(x) = f_1 x$, with $0 \le f_1 < 1$. The resulting bit priors for the set of bits $b_n$ comprising the QAM symbol $s_n$ implicitly produce a prior distribution for QAM symbol $s_n$ (n-th entry of the vector s) and are used to compute the mean (denoted via $\bar{s}_n[k]$) and the standard deviation (denoted via $d_n[k]$) of $s_n$ with respect to this prior distribution.

Next, the conditional MMSE filter is designed, 610. First let $C[k]$ denote the $N_t \times N_t$ diagonal matrix whose i-th entry on the diagonal equals the inverse of $d_i[k]$. Then the conditional MMSE filter $W[k]$ is given by $$W[k] = [H^H H + N_o C^2[k]]^{-1} H^H$$

As the above equation for generating $W[k]$ suggests, the filter $W[k]$ on the specific tone, in general, changes with iterations. In particular, note that, although the channel term H on the tone stays fixed with iteration index "k", $W[k]$ changes with "k" through $C[k]$, which captures the effect of the extrinsic information on the symbols on iteration "k".

The scalar number $N_o$ represents the effective power of noise and interference in each of the entries of the interference vector w, while the superscript $H$ denotes the Hermitian (conjugation and transposition) operation. In addition an augmented matrix $G[k]$ is constructed by the module as follows:

$$G[k] = \begin{bmatrix} H[k] \\ \sqrt{N_o}\, C[k] \end{bmatrix}.$$

The matrix $W[k]$ produced by the MMSE filter design module 610 is provided as input to the MMSE filleting module 620. The MMSE filter module 620 then produces as its output an $N_t \times 1$ vector $\hat{s}[k]$, which is a linear soft estimate of the vector $\tilde{s}[k] = s - \bar{s}[k]$ as follows:

$$\hat{s}[k] = W[k](y - H\bar{s}[k]).$$

As discussed above, the linear soft estimate above changes as a function of iteration "k" via the extrinsic information provided by the outer decoder on the coded bits on the given tone on iteration "k", through $W[k]$ and $\bar{s}[k]$ above.

In one embodiment, the QR decomposition block 630 takes as input the augmented matrix $G[k]$ produced by the MMSE filter module 610. The QR decomposition module 630 then generates as its output a good symbol order $\pi[k] = [\pi_1[k]\, \pi_2[k] \ldots \pi_N[k]]$ for the SOMA tree search, 640, along with a lower triangular $N_t \times N_t$ matrix $R[k]$ (i.e., a matrix whose entry on the i-th row and the j-th column equals zero if $i < j$). The vector $\pi[k]$ is a permutation of the integers $1, 2, \ldots, N$, (with $N = N_t$). Its n-th element, i.e., $\pi_n[k]$, denotes that symbol $s_m$ is the n-th symbol in the tree-search (i.e., the symbol introduced in the search at depth n), and where $m = \pi_n[k]$.

Given a symbol order $\pi$, let $s_\pi$ denote the $N \times 1$ vector whose n-th entry is $s_m$ for $m = \pi_n$. We also let $P_\pi$ denote the permutation matrix associated with a given order $\pi$. Specifically, $P_\pi$ is the $N_t \times N_t$ permutation matrix with the following property: the vector resulting by multiplying s from the left with $P_\pi$ (i.e. the vector $P_\pi s$) equals $s_\pi$, i.e., $P_\pi s = s_\pi$. At the k-th inner decoder iteration, the QR decomposition box 630 produces such a symbol-order $\pi[k]$ (or equivalently a permutation matrix $P[k] = P_{\pi[k]}$) and a corresponding $N \times N$ lower triangular matrix $R[k]$ from the QR decomposition associated with this order.

For illustration, when the symbol order is the natural order $\pi[k] = [1\, 2 \ldots N]$ (in which case $P[k]$ is the identity matrix), the resulting $R[k]$ is the lower triangular matrix associated with the QR decomposition of $G[k]$, i.e., the QR decomposition module 630 finds a unitary $Q[k]$ and a lower triangular $R[k]$, such that $G[k] = Q[k]R[k]$. For the case that $\pi[k]$ equals some arbitrary but fixed symbol order it, the matrix $R[k]$ is the lower triangular matrix in the QR decomposition of the matrix that is the product $G[k]\,(P_\pi)^T$, i.e., the QR decomposition module finds a unitary $Q[k]$ and a lower triangular matrix $R[k]$, such that $$G[k](P[k])^T = Q[k]R[k], \qquad \text{Eqn (1)}$$

and where $P[k] = P_{\pi[k]}$ and the superscript T denotes transposition.

In one embodiment, the order $\pi[k]$ is selected by the QR decomposition module 630. In one embodiment, a random order is selected. In another embodiment, the order is selected recursively by adding one symbol at the time in the order. To select the first symbol in the order, each symbol is considered as being the first symbol in the order. Then the QR decomposition and the magnitude of the (1,1) entry in the associated $R[k]$ matrix is computed for each choice of a "first symbol in the order".

The symbol choice yielding the highest magnitude (1,1) entry is chosen as the first symbol index in the order. The process is repeated to add the rest of the symbols in the symbol order recursively. Given that the n first symbols have been selected, each of the remaining N-n symbols is considered as the next symbol in the symbol-order. The magnitude of the (n+1,n+1) entry in the resulting R[k] from the associated QR decomposition is computed for each choice of next symbol in the order. These magnitudes are then compared and the symbol yielding the largest magnitude is chosen as the next symbol in the order. When the process is completed and the order π[k] (or, equivalently, P[k]) is produced, then the associated R[k] is computed from Eqn. (1) and provided as input to the soft-output algorithm component 640.

Another component in the inner-decoder module is a controlled tree-search soft-output M-algorithm module 640. The algorithm takes as input a set of symbol priors, a symbol order π[k] and an associated lower triangular matrix R[k], a linear MMSE estimate ŝ[k], the mean vector s̄[k], and the standard deviation vector d[k].

The set of priors that are inputs to the algorithm are produced by a discount-factor function $F_2$ that operates in a manner similar to $F_1$ (660). The discounting factor function $F_2$ (665) is also an odd-valued function for which $0 < F_2(x) \le x$ for all $x>0$, and has the effect of making the bit priors produced by $L_a(b;k)$ more robust. In one embodiment, $F_2(x)=f_2 x$, with $0<f_2 \le 1$.

In one embodiment, a set of equations may be used to set up the SOMA tree search at the k-th iteration assuming the symbol-order in the tree search is the natural order $\pi[k]=[1\ 2\ \ldots\ N]$. The set of equations in the general case involving a general π[k], can be obtained from the natural-order algorithm by replacing $s_i, \hat{s}_i, \bar{s}_i, d_i, b$, with $s_m, \hat{s}_m, \bar{s}_m, d_m, b_m$ and where $m=\pi_i[k]$. To describe the tree on which the limited search will be performed by the soft-output M-algorithm, it is convenient to consider the operation of the exhaustive Max-LogMAP algorithm in the k-th iteration and express it as an exhausted tree-search computation. This MaxLogMAP algorithm computes for all values of m and n (i.e., all choices of m and n integers such that $1 \le m \le N$ and $1 \le n \le B$), the following log-likelihood ratio values $$L(b_m^n) = ll_o(b_m^n=1;k) - ll_o(b_m^n=0;k)$$

where $$ll_o(b_m^n = u; k) = \max_{s:b(s) \in B_u^{m,n}} -\|y - Hs\|^2 / N_o + ll_a(b(s); k)$$

$$= - \min_{s:b(s) \in B_u^{m,n}} [\|y - Hs\|^2 / N_o - ll_a(b(s); k)]$$

and where $ll_a(b(s);k)$ are the log-likelihood priors at the k-th iteration, i.e., the output of the discount factor function $F_2$, on the k-th iteration.

In computing $ll_o(b_m^n=u;k)$, for $u=0, 1$, the following representation can be exploited:

$$-N_o ll_o(b_m^n = u; k) = \min_{s:b(s) \in B_u^{m,n}} \|y - Hs\|^2 - N_o ll_a(b(s); k)$$

$$= C + \min_{s:b(s) \in B_u^{m,n}} \|R[k](\hat{s}[k] - (s - \bar{s}[k]))\|^2 -$$

$$\|C[k](s - \bar{s}[k])\|^2 - N_o ll_a(b(s); k)$$

$$= C + \min_{s:b(s) \in B_u^{m,n}} \sum_{i=1}^{N}$$

$$\left( \left| R_{ii}[k]\left(\begin{array}{c}\hat{s}_i[k] - \\ (s_i - \bar{s}_i[k])\end{array}\right) + \sum_{1 < j < i} R_{ij}[k]\left(\begin{array}{c}\hat{s}_j[k] - \\ (s_j - \bar{s}_j[k])\end{array}\right) \right|^2 - \right.$$

$$\left. N_o \frac{|s_i - \bar{s}_i[k]|^2}{d_i^2[k]} - N_o ll_a(b_i(s_i); k) \right)$$

This is the set of equations based on which the SOMA tree, along with its branch metric computations is defined for the given symbol order. To see how the tree is defined, consider the last equation above. Note that on the reduced tree search, the "min" operation listed happens over a subset of all paths i.e., not for all paths. For each such path considered by the "min" operation, in full length on the tree we would compute the big outer sum. The index "i" in that sum reflects the depth in the tree. The ith term in the sum shows the branch metric computed at depth "i" for that path. As the equation reveals, this ith term depends only on symbols 1,2, . . . i, i.e., only on the part of the path through the tree so far up to depth i. On the tree at depth "i", this branch metric would be first computed and then added to the partial path metric so far, that is, the sum of all branch metrics 1 to i−1 (already computed at the previous depth for this path), in order to produce the metric of the partial path up to depth i. Note that at full length, N, the path metric gives the whole sum from 1 to N. Note also that even if the symbol order is kept the same on a tone from one iteration to the next, the decomposition of the computations on the tree can be different.

In the above representations, the constant C does not depend on s. If the above representation is used to conduct the exhaustive MaxLogMAP computation, the metrics that are computed for each vector candidate s can be computed on a tree. Indeed, the metric for a specific value of the codeword s can be computed as the sum of N "branch" metrics, whereby the mth metric depends only in the first m elements of s. T This tree is thus the tree used for conducting the reduced-search on the tree via a soft-output M-algorithm. Note that the above approach can be used with any soft-output M-algorithm structure. For instance, it can be used in conjunction with soft-output M-algorithms that use a priori chosen M values, and the M value can be potentially different from one depth level in the tree to the next and from one iteration to the next. In another embodiment, channel-adaptive SOMA implementations are used, where channel knowledge at the receiver is exploited to choose the M value adaptively over tones, iterations, and tree depth. In addition, in each case one may employ forward-pass only SOMA algorithms, or forward-backward pass soft-output algorithms.

A class of embodiments involves the following choice for the discount factor functions $F_k(x)=f_k x$, with $0 \le f_1 < 1$ and $0<f_2 \le 1$. In one embodiment, $f_1=0$. In this case, the MMSE filter, the QR decomposition, the symbol order on the tree, and thus the tree on which the tree-search takes place do not change from iteration to iteration. As a result, there are no more front-end computations after the first iteration. The only component changing in the operation of the inner decoder in subsequent iterations is the priors provided by the outer decoder. When $f_1=1$, these are used in the SOMA algorithm in the standard practice without discounting.

Another embodiment involves the case where an $f_1$ is used satisfying $0<f_1<1$, and where $f_2=1$. In that case "conservative" priors are used for forming the conditional mean and conditional variance estimates (the smaller the $f_1$ value used the higher the degree of conservatism). In this case the MMSE filter, the QR decomposition, the symbol order on the tree, and thus the tree on which the tree-search takes place do change from iteration to iteration. Yet another preferred embodiment involves the case where an $f_1$ is used satisfying $0<f_1<1$, and whereby and where $f_2=f_i$. In that case, the same "conservative" priors used for computing the conditional mean and variance are also used in the SOMA tree-search.

Another embodiment involves the use of a simplified conditional-variance computation. In particular, in this embodiment a vector $d[k]$ is generated by the inner decoder with all-equal entries, i.e., a vector of the form $d[k]=[d[k]\ d[k]\ \ldots\ d[k]]^T$ is produced by the module computing it. The advantage of this scheme is in the computations needed to generate the MMSE filter used for each iteration. Specifically, in computing the MMSE filter a computation of the inverse of a matrix is only required on the first operation. In subsequent operations, the new MMSE filter can be computed by means of simply updating the MMSE filter from the previous iteration (i.e., without computing the inverse of a new matrix). An alternative interpretation can be obtained by considering the eigenvalue decomposition of $H^H H = V \Lambda V^H$, where $V=[v_1, v_2, \ldots, v_N]$ is a unitary matrix and $\Lambda$ is a diagonal matrix $\Lambda = \text{diag}(\lambda_1, \lambda_2, \ldots, \lambda_N)$, with $\lambda_k \geq 0$. In this case the MMSE filter at the k-th iteration can be expressed as $$W[k] = (\Sigma_{1 \leq i \leq N} \rho_i[k] v_i v_i^H)/H^H,$$

with $\rho_i[k] = 1/(\lambda_i + d^2[k] N_o)$. Once the eigen-decomposition of $H^H H$ is computed (which in a computational sense is equivalent to a matrix-inversion computation) all the MMSE filters can be computed without requiring any more eigen-decompositions or matrix inversions. In one variation of this embodiment, the QR decomposition module outputs the same symbol order $\pi[k]=\pi[1]$ for all iterations, but a new $R[k]$ is recomputed for each k, based on the associated $G[k]$.

Several simplified versions of the QR decomposition module can be constructed. In one case, the symbol order $\pi[k]$ is not updated at every iteration, but every K iterations, for some K>1. The associated lower triangular matrix $R[k]$ is recomputed by the QR decomposition module for each new choice of $W[k]$. In one special case of interest, the decoder uses $K \to \infty$. In that case the same symbol order $\pi[1]$, computed on the first iteration, is subsequently used for all iterations.

In one embodiment, the symbol order $\pi[k]$ and the associated $R[k]$ (computed by the QR decomposition module, and the filter $W[k]$ (computed by the MMSE filter design module) are updated every K iterations. In another embodiment, the $d[k]$ estimate vector produced by the QAM Priors Computation module 670 is set at iteration k to the same value as $d[k-1]$, unless a sufficient change in the elements from iteration k-1 to iteration k has been recorded. Thus, computation complexity reduction may be accomplished, since in the event that $d[k]=d[k-1]$, the MMSE filter calculation and QR decomposition computations stay the same at iteration k.

The examples that follow provide a number of embodiments involving the operation of the SOMA module in the inner decoding module. One embodiment uses the variance estimate, $(d_m[k])^2$, as an indicator of the reliability of the m-th symbol at iteration k, as a method of tailoring the complexity of the search associated with that symbol in the SOMA tree. In one extreme, a symbol with sufficiently low variance estimate can be viewed as a symbol that can be decoded correctly with very high probability and can then be "cancelled/subtracted off" from the aggregate signal. The resulting "N−1"-level problem can be then treated as in the preceding embodiments.

In one embodiment, parts of the adaptivity may be selectively updated on a tone-by-tone basis on each iteration. In one embodiment, the front-end and tree decomposition updates for tones may be performed only when there is a sufficiently large change in extrinsic information from the previous iteration. For instance for those tones for which there is a small change in the extrinsic information from iteration "k" to iteration "k+1", the tree decomposition shown in the equation set above from k=k may be used. Specifically, the last equation shown in paragraph 0066 also describes the tree decomposition for iteration "k+1" on those tones, provided $ll_a(\bullet, k)$ is changed to $ll_a(\bullet, k+1)$.

In one embodiment, if the "prior" reliability for a given bit (i.e., the associated discounted soft-output from the outer decoder) is above a given threshold value, the bit can be viewed as one that can be decoded correctly with very high probability. In that case, the SOMA tree search can be simplified (without appreciable loss in performance) at the three depth at which the QAM symbol associated with the given bit is considered. Specifically, at that depth, only candidates for which the associated QAM symbol takes values in agreement to the most likely value for the given bit are considered and expanded/evaluated on the tree.

An Example of a System

Figure 7:
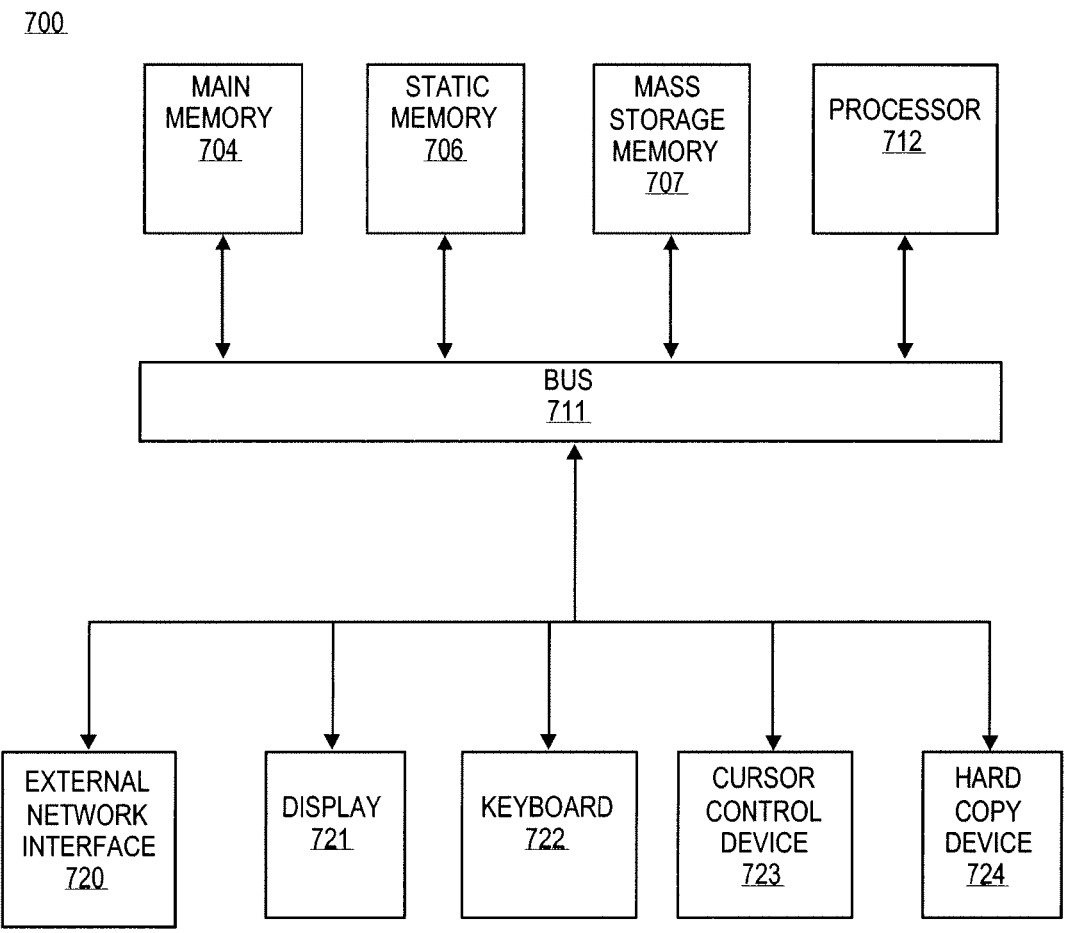
FIG. 7 is a block diagram of one embodiment of an electronic system that may include a MIMO decoder as described herein.

FIG. 7 is a block diagram of one embodiment of an electronic (e.g., computer) system that may include a MIMO decoder as described herein. Referring to FIG. 7, computer system 700 may comprise an exemplary client or server computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, PowerPC™, Alpha™, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for marking information on a medium such as paper, film, or similar types of media. Another device that may be coupled to bus 711 is a wired/ wireless communication capability 725 to communication to a phone or handheld palm device.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Note that any or all of the components of system 700 and associated hardware may be used. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A receiver for use in an orthogonal frequency division multiplexing (OFDM) wireless communication system to receive signals from a transmitter that transmits the signals using OFDM and bit interleaved coded modulation, the receiver comprising:

an inner decoder structure having an adaptive front end, the inner decoder structure communicatively coupled to receive extrinsic information, the adaptive front end to utilize the extrinsic information from one or more prior decoder iterations and channel information corresponding to a portion of the received signals, to generate one or more filtered signal estimates, and to receive the one or more filtered signal estimates, the inner decoder structure having a soft output M-algorithm (SOMA) based multiple-in multiple-out (MIMO) demapper that utilizes the one or more filtered signal estimates to perform inner demapping over each tone, wherein the adaptive front end modifies subspace decomposition and metric calculations for each level of a tree utilized by the SOMA demapping; and an outer decoder communicatively coupled with the inner decoder to perform iterative decoding and to provide extrinsic information related to the iterative decoding to the adaptive front end.

2. A receiver for use in an orthogonal frequency division multiplexing (OFDM) wireless communication system to receive signals from a transmitter that transmits the signals using OFDM and bit interleaved coded modulation, the receiver comprising:

an inner decoder structure having an adaptive front end, the inner decoder structure communicatively coupled to receive extrinsic information, the adaptive front end to utilize the extrinsic information from one or more prior decoder iterations and channel information corresponding to a portion of the received signals, to generate one or more filtered signal estimates, and to receive the one or more filtered signal estimates, the inner decoder structure having a soft output M-algorithm (SOMA) based multiple-in multiple-out (MIMO) demapper that utilizes the one or more filtered signal estimates to perform inner demapping over each tone, wherein the inner decoder structure, the SOMA-based MIMO demapper performs a search on a detection tree for each tone where only a subset of alternatives from every level of the tree are expanded, using a tree-search symbol order that is adapted for each tone based on the filtered signal estimates; and an outer decoder communicatively coupled with the inner decoder to perform iterative decoding and to provide extrinsic information related to the iterative decoding to the adaptive front end.

3. The receiver of claim 2 wherein a SOMA detection tree is constructed for any given symbol order based on the channel state information, the extrinsic information provided by the outer decoder on preceding iterations and the filtered estimates, wherein a metric of each full-length path in the detection tree yields the soft-output for a corresponding path, while at any intermediate depth the ratio of signal power to total interference power is maximum for the symbol at that depth.

4. The receiver of claim 2 wherein a detection tree order is chosen recursively, by selecting as a first tree symbol the symbol that yields a higher ratio of signal-power-to-interference power at depth 1, and recursively selecting as the symbol at the next tree depth, the symbol among the symbols not yet selected that yields the higher ratio of signal-power-to-interference power at the next depth.

5. A receiver for use in an orthogonal frequency division multiplexing (OFDM) wireless communication system to receive signals from a transmitter that transmits the signals using OFDM and bit interleaved coded modulation, the receiver comprising:

an inner decoder structure having an adaptive front end, the inner decoder structure communicatively coupled to receive extrinsic information, the adaptive front end to utilize the extrinsic information from one or more prior decoder iterations and channel information corresponding to a portion of the received signals, to generate one or more filtered signal estimates, and to receive the one or more filtered signal estimates, the inner decoder structure having a soft output M-algorithm (SOMA) based multiple-in multiple-out (MIMO) demapper that utilizes the one or more filtered signal estimates to perform inner demapping over each tone; and an outer decoder communicatively coupled with the inner decoder to perform iterative decoding and to provide extrinsic information related to the iterative decoding to the adaptive front end, wherein the outer decoder provides to the adaptive front end extrinsic information regarding reliability of one or more symbols at each decoding iteration.

6. The receiver of claim 5 wherein channel information comprises estimates of channel gains on any subset of transmitter-receiver antenna pairs and OFDM tones.

7. The receiver of claim 6 wherein the channel information comprises quality metrics corresponding to the channel gain estimates and estimates of interference power levels.

8. The receiver of claim 5 wherein the adaptive front end combines the extrinsic information regarding reliability of the one or more symbols with channel state information to select a tree search order.

9. A method for iterative decoding of orthogonal frequency division multiplexing (OFDM) wireless signals received from a transmitter that transmitted the signals using OFDM and bit interleaved coded modulation, the method comprising:

determining, in a wireless receiver system, channel coefficients corresponding to the signals;

receiving, in the wireless receiver system, extrinsic information from one or more prior decoding iterations;

generating, in the wireless receiver system, one or more filtered signal estimates based, at least in part, on the extrinsic information;

iteratively performing, in an adaptive front end of an inner decoder of the wireless receiver system, an adaptive soft output M-algorithm (SOMA)-based multiple-input/multiple-output (MIMO) detection process in the inner decoder over each tone of the signals by searching a detection tree for each tone, where tree search parameters are selected based on the one or more filtered signal estimates and at least in part on the extrinsic information for each iteration of an outer decoder; and iteratively performing decoding, in the outer decoder to provide extrinsic information related to the iterative decoding to the adaptive front end, wherein the outer decoder provides to the adaptive front end extrinsic information comprising information indicative of reliability of one or more symbols at each decoding iteration.

10. The method of claim 9 wherein channel information comprises estimates of channel gains on any subset of transmitter-receiver antenna pairs and OFDM tones.

11. The method of claim 10 wherein the channel information comprises quality metrics corresponding to the channel gain estimate and estimates of interference power levels.

12. A method for iterative decoding of orthogonal frequency division multiplexing (OFDM) wireless signals received from a transmitter that transmitted the signals using OFDM and bit interleaved coded modulation, the method comprising:

determining, in a wireless receiver system, channel coefficients corresponding to the signals;

receiving, in the wireless receiver system, extrinsic information from one or more prior decoding iterations;

generating, in the wireless receiver system, one or more filtered signal estimates based, at least in part, on the extrinsic information;

performing, in the wireless receiver system, a soft output M-algorithm (SOMA)-based multiple-input/multiple-output (MIMO) detection process over each tone of the signals by searching a detection tree for each tone, where tree search parameters are selected based on the one or more filtered signal estimates and at least in part on the extrinsic information further comprising modifying subspace decomposition and metric calculations for each level of the detection tree utilized by the SOMA demapping for each of a plurality of iterations.

13. A method for iterative decoding of orthogonal frequency division multiplexing (OFDM) wireless signals received from a transmitter that transmitted the signals using OFDM and bit interleaved coded modulation, the method comprising:

determining, in a wireless receiver system, channel coefficients corresponding to the signals;

receiving, in the wireless receiver system, extrinsic information from one or more prior decoding iterations;

generating, in the wireless receiver system, one or more filtered signal estimates based, at least in part, on the extrinsic information;

performing, in the wireless receiver system, a soft output M-algorithm (SOMA)-based multiple-input/multiple-output (MIMO) detection process over each tone of the signals by searching a detection tree for each tone, where tree search parameters are selected based on the one or more filtered signal estimates and at least in part on the extrinsic information further comprising, wherein the SOMA-based detection process comprises a search on a detection tree for each tone using a tree-search symbol order that is adapted for each tone based on the filtered signal estimates, where only a number of best alternatives from every level of the tree are expanded.

14. The method of claim 13 wherein a SOMA detection tree is constructed for any given symbol order based on the channel state information, the extrinsic information provided by the outer decoder on preceding iterations and the filtered estimates, wherein a metric of each full-length path in the detection tree yields the soft-output for a corresponding path, while at any intermediate depth the ratio of signal power to total interference power is maximum for the symbol introduced at that depth.

15. The method of claim 13 wherein a detection tree order is chosen recursively, by selecting as a first tree symbol the symbol that yields a higher ratio of signal-power-to-interference power at depth 1, and recursively selecting as the symbol at the next tree depth, the symbol among the remaining symbols that yields the higher ratio of signal-power-to-interference power at the next depth.

16. An apparatus for decoding orthogonal frequency division multiplexing (OFDM) wireless signals received from a transmitter that transmitted the signals using OFDM and bit interleaved coded modulation, the apparatus comprising:

means for determining channel coefficients corresponding to the signals;

means for receiving extrinsic information from one or more prior decoding iterations;

means for generating one or more filtered signal estimates based, at least in part, on the extrinsic information;

means for iteratively performing, in an inner decoder of an adaptive front end of a wireless receiver system, an adaptive soft output M-algorithm (SOMA)-based multiple-input/multiple-output (MIMO) detection process in the inner decoder over each tone of the signals by searching a detection tree for each tone, where tree search parameters are selected based on the one or more filtered signal estimates and at least in part on the extrinsic information for each iteration of an outer decoder; and means for iteratively performing decoding, in the outer decoder, to provide extrinsic information related to the iterative decoding to the adaptive front end, wherein the outer decoder provides to the adaptive front end extrinsic information comprising information indicative of reliability of one or more symbols at each decoding iteration.

17. The apparatus of claim 16 wherein channel information comprises estimates of channel gains on any subset of transmitter-receiver antenna pairs and OFDM tones.

18. The apparatus of claim 17 wherein the channel information comprises quality metrics corresponding to the channel gain estimates and estimates of interference power levels.

19. An apparatus for decoding orthogonal frequency division multiplexing (OFDM) wireless signals received from a transmitter that transmitted the signals using OFDM and bit interleaved coded modulation, the apparatus comprising:

means for determining channel coefficients corresponding to the signals;

means for receiving extrinsic information from one or more prior decoding iterations;

means for generating one or more filtered signal estimates based, at least in part, on the extrinsic information;

means for performing a soft output M-algorithm (SOMA)-based multiple-input/multiple-output (MIMO) detection process over each tone of the signals by searching a detection tree for each tone, where tree search parameters are selected based on the one or more filtered signal estimates and at least in part on the extrinsic information, further comprising means for modifying subspace decomposition and metric calculations for each level of the detection tree utilized by the SOMA demapping for each of a plurality of iterations.

20. An apparatus for decoding orthogonal frequency division multiplexing (OFDM) wireless signals received from a transmitter that transmitted the signals using OFDM and bit interleaved coded modulation, the apparatus comprising:
- means for determining channel coefficients corresponding to the signals;
- means for receiving extrinsic information from one or more prior decoding iterations;
- means for generating one or more filtered signal estimates based, at least in part, on the extrinsic information;
- means for performing a soft output M-algorithm (SOMA-based multiple-input/multiple-output (MIMO) detection process over each tone of the signals by searching a detection tree for each tone, where tree search parameters are selected based on the one or more filtered signal estimates and at least in part on the extrinsic information, wherein the SOMA-based MIMO demapper performs a search on a detection tree for each tone where only a subset of alternatives from every level of the tree are expanded, using a tree-search symbol order that is adapted for each tone based on the filtered signal estimates.

21. The apparatus of claim 20 wherein a SOMA detection tree is constructed for any given symbol order based on the channel state information, the extrinsic information provided by the outer decoder on preceding iterations and the filtered estimates, wherein a metric of each full-length path in the detection tree yields the soft-output for a corresponding path, while at any intermediate depth the ratio of signal power to total interference power is maximum for the symbol at that depth.

22. The apparatus of claim 20 wherein a detection tree order is chosen recursively, by selecting as a first tree symbol the symbol that yields a higher ratio of signal-power-to-interference power at depth 1, and recursively selecting as the symbol at the next tree depth, the symbol among remaining symbols that yields the higher ratio of signal-power-to-interference power at the next depth.

\* \* \* \* \*